Nov. 9, 1971    J. HERMANN    3,618,485
ECCENTRIC SHAKER FOR EARTH COMPACTING APPARATUS
Filed Nov. 16, 1970    2 Sheets-Sheet 1

INVENTOR
JOACHIM HERMANN
BY
Robert H Jacob
AGT.

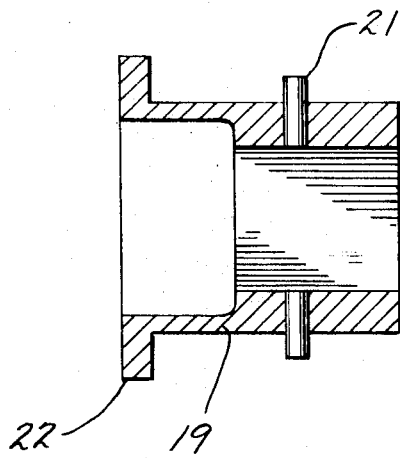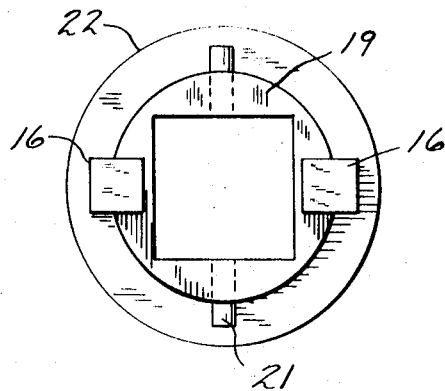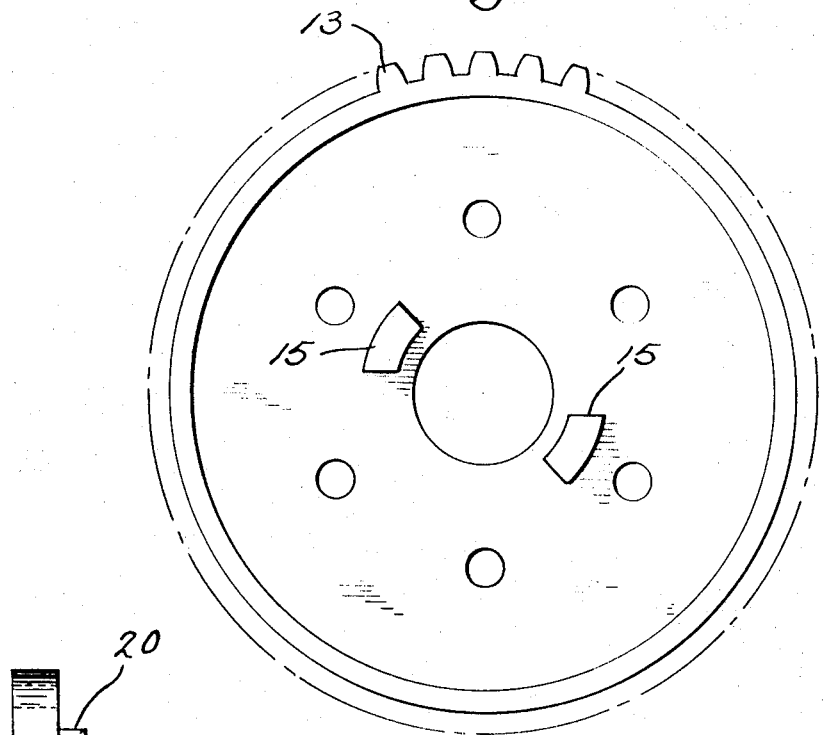

United States Patent Office 3,618,485
Patented Nov. 9, 1971

3,618,485
ECCENTRIC SHAKER FOR EARTH COMPACTING APPARATUS
Joachim Hermann, Munich, Germany, assignor to Wacker Werke KG, Munich, Germany
Continuation-in-part of application Ser. No. 790,960, Jan. 14, 1969. This application Nov. 16, 1970, Ser. No. 89,691
Claims priority, application Germany, Jan. 15, 1968, P 17 08 553.9
Int. Cl. E01c 19/30
U.S. Cl. 94—48　　　　　　　　　　　　　2 Claims

ABSTRACT OF THE DISCLOSURE

The eccentric shaker for earth compacting has two eccentric bodies mounted on the eccentric supporting shaft on which one body is fixedly mounted and which is driven by a chain drive and disposed parallel to the control shaft, while the oppositely operating eccentric body is rotatably mounted upon the eccentric shaft and driven by a toothed gear transmission, the toothed gear of which is rotatably journalled upon the control shaft and forms a housing having two oppositely disposed control tracks at the upper end and two oppositely disposed abutment cams at the bottom which cooperate with two oppositely disposed abutment cams upon an axially movable sleeve on the control shaft which is spring biased against the toothed gear and non-rotatably mounted on the control shaft by means of a multiple wedge element by way of a collar, a stud and a control device.

BACKGROUND OF THE INVENTION

The present application is a continuation-in-part of applicant's Ser. No. 790,960 filed Jan. 14, 1969 and now abandoned.

The invention relates generally to earth compacting apparatus or equipment for use primarily at construction sites. More in particular, the invention concerns an eccentric shaker particularly for ground compacting apparatuses or machines where two oppositely driven eccentrics are provided upon a common shaft, and where the change in the direction of the vibrations of the eccentrics is obtained by relative turning of one eccentric with respect to the other by means of an engageable and disengageable coupling.

The adjusting or setting of the direction of vibrations of vibrating plates during operation is required, for example, in steering the apparatus and/or to effect its forward and backward movement.

Different structural solutions for the setting of the directional components have become known, which concern essentially devices for changing the phase relationship of two eccentrics which rotate upon parallel shafts.

Thus, for example, an automatically moving vibrating device for compacting the ground has a toothed gear coupling which comprises two meshing main toothed gears for the eccentrics and two meshing auxiliary toothed gears where the auxiliary toothed gears are pivotally supported for regulating the phase position at any particular time.

In another plate or disk shaker the phase position of the oppositely moving eccentrics can be adjusted by means of sets of gears which are in engagement with one another and axially adjustable toothed gears.

In a further embodiment a hydraulic adjusting cylinder having a piston that is driven from both sides is provided, the axial movement of which effects the turning adjustment of the eccentric.

Furthermore, a coupling is known in connection with earth compacting devices for the relative turning in steps of two rotating shafts by means of a toothed gear transmission, where one toothed gear of the gear transmission is disposed loosely for displacement upon a shaft and between two engagement or abutment members connected with this shaft, and which has catches or pawls on both sides which in different angular positions engage the abutment members as abutments, whereby for each axial displacement of the toothed gear from one end position to the other, a relative turning movement takes place that corresponds to the angular position of the abutments and pawls or catches to one another.

In a further known eccentric shaker having two oppositely rotating eccentric shafts, each of which carries an eccentric mass consisting of three partial masses, the central, rotatable one of which is twice as large in relation to the outer partial masses as each of the outer partial masses, the outer partial masses are firmly seated upon an axially displaceable bearing sleeve, but non-rotatably guided upon the eccentric shafts, upon which the central partial mass is only loosely carried, whereby this partial mass that can be stopped by a stationary latch as the bearing sleeve is axially displaced by a claw coupling that is connected with one of the outer partial masses is releasable, and can again be connected with the claw coupling by turning of the eccentric shafts at optional angular positions.

All of these known measures for changing the direction of vibration, for example for the purpose of inducing the forward and return movement of ground compacting devices, are of relatively expensive construction, sensitive when used at rough construction sites and therefore particularly subject to breakdowns.

In the known coupling for the relative turning in steps of two rotating shafts by means of a toothed gear transmission, it has been found in practice that considerable wear takes place if a loosely mounted gear is continuously displaced in axial direction. The reduction of the meshing gears at the edges of the gear is unequal due to the differences in the engagement locations at any time. This results in adverse effects on the entire control mechanism and constitutes an interference in the function of the entire apparatus. This different reduction at the flanks of the teeth is further accelerated in that the control coupling is subjected to a very strong rattling force. The divided eccentric mass constitutes a further shortcoming of these earth compacting devices. This division, however, is inevitably necessary in order to find space for a toothed gear in the center. This dividing in two of the eccentric masses upon a shaft, however, does not only require a complicated manner of construction of the entire mechanism but beyond that, besides the necessary two control cams, also a decrease in the space that is available for accommodating the eccentric.

Therefore, the proposal has already been made in connection with another known eccentric shaker not to use the loosely mounted toothed gear any longer. By this means, however, the construction becomes even more expensive because an eccentric mass that is divided into three is provided upon a shaft whereby necessarily the control or guided sleeve is disposed therebetween.

SUMMARY OF THE INVENTION

It is, therefore, an object of the invention to avoid the disadvantages of known devices and to replace the known gear transmission produced at the expense of high precision by a simple, readily produceable and, above all, robust reversing device that makes possible easy setting of the phase position of the eccentrics.

In accordance with the invention, this problem is solved in that the eccentric body which is rigidly mounted upon the eccentric shaft is driven by way of a chain drive having a chain wheel that is fixedly disposed upon the control shaft which is parallel to the eccentric shaft, and the oppositely operating eccentric body that is rotatably mounted upon the eccentric shaft is driven by means of a toothed gear transmission, whose toothed gear that is rotatably journalled upon the control shaft forms a control housing at the upper end of which two control tracks oppositely disposed at an angle of 180°, and at the bottom of which two abutment cams oppositely disposed at an angle of 180° are provided, which cooperate with two abutment cams oppositely disposed at 180° upon a sleeve axially shiftable upon the control shaft, pressed by means of a spring against the toothed gear, provided with pins and non-rotatably mounted by means of a multiple wedge element upon the control shaft by way of a collar, a stud and a suitable control device.

BRIEF DESCRIPTION OF THE DRAWINGS

Further advantageous features of the invention will become apparent from the following description with reference to the accompanying drawings, in which FIG. 2 is a partial section taken along the line A–B in FIG. 1, FIG. 3 is a detail in accordance with FIG. 1, FIG. 4 illustrates an individual part of FIG. 1, and FIG. 5 is a top view of the sleeve 19 as shown in FIG. 2.

DESCRIPTION OF THE PREFERRED EMBODIMENTS

Figure 1:
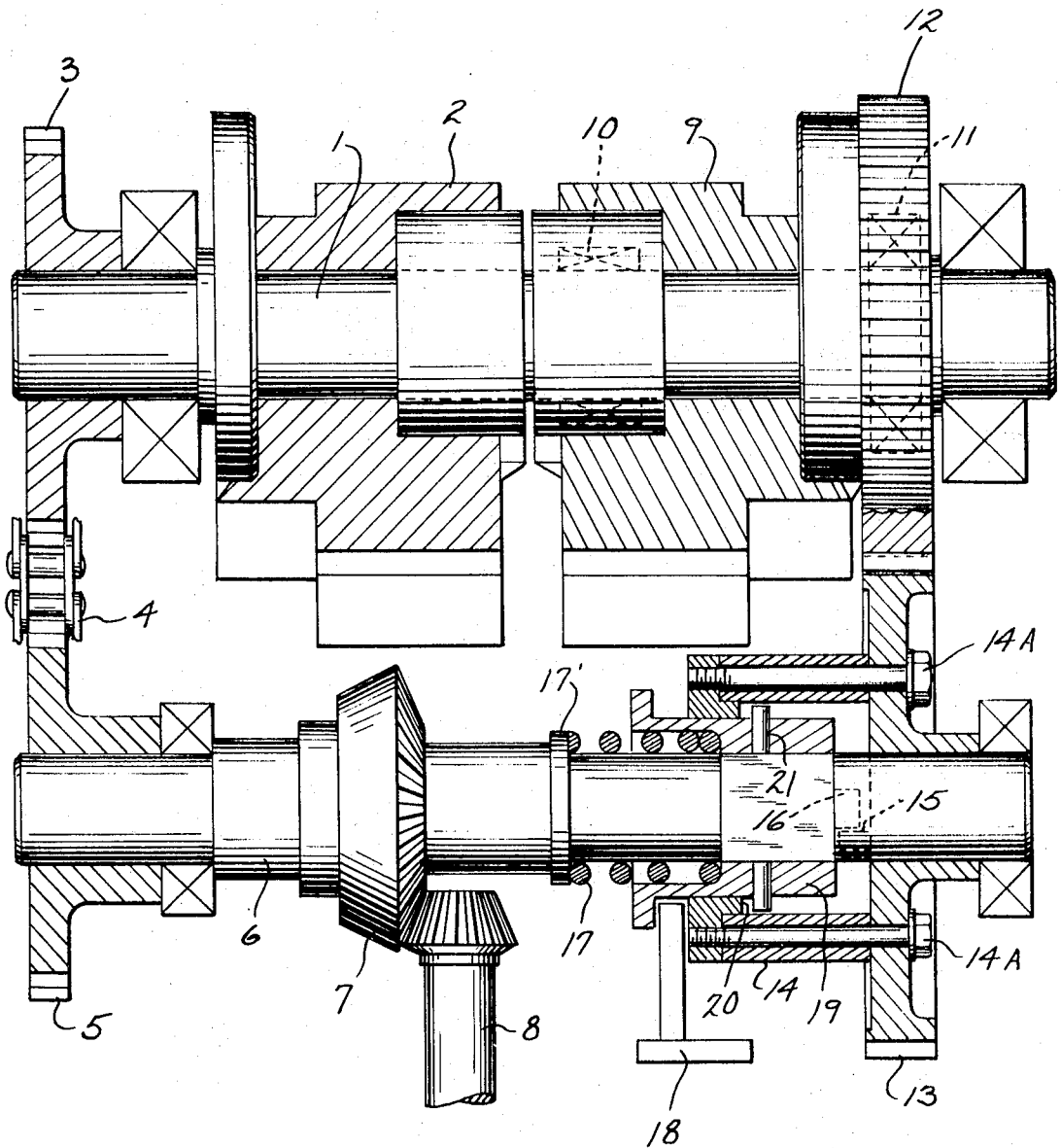
FIG. 1 is an overall plan view of the device in accordance with the invention.

An eccentric shaft 1 has fixedly mounted thereon an eccentric element 2 and a chain wheel 3. The chain wheel 3 and thereby the eccentric shaft 1 are driven by way of a chain 4 and a chain wheel 5 which is mounted upon a control shaft 6 disposed parallel to the eccentric shaft 1. A toothed gear 7 is disposed upon the control shaft 6 and is driven by the pinion 8. The pinion 8 is driven by a drive motor, for example, a combustion engine motor (not shown). A further eccentric member 9 is rotatably disposed by way of bearing elements 10 and 11 upon the eccentric shaft 1. The eccentric element 9 is fixedly connected with a toothed gear 12 and is driven by means of a toothed gear 13 rotatably mounted upon the control shaft 6. The toothed gear 13 forms one end of a cylindrical housing 14 held together by bolts 14a at the bottom of which two abutment members 15 oppositely disposed at an angle of 180° are arranged, and at the other end of which two control tracks 20 which are likewise oppositely disposed at an angle of 180° are formed as seen in FIG. 4. A sleeve 19 disposed slidably but non-rotatably upon the control shaft 6 extends into the housing 14, and which at the end extending into the housing also has two studs 16 oppositely disposed at an angle of 180°. Pins 21 are provided upon the sleeve 19. The sleeve 19 is pressed against the toothed gear 13 by means of a spring 17 which is supported against a shoulder 17' on shaft 6. By actuating a member such as a bolt 18 with a suitable device the sleeve 19 is axially slidable upon the control shaft 6 by way of the collar 22 in a direction opposite to the force exerted by the spring 17.

Sleeve 19 has a square opening and is seated on a corresponding square portion on shaft 6 so that it can slide axially but is not rotatable. Gear 13 with housing 14 is loosely seated on shaft 6 and is rotatable on the shaft. In operation gear 13 is moved by means of shaft 6, sleeve 19 with studs 16 and abutment members 15 disposed on the gear 13. When abutment members 15 and studs 16 are disengaged, gear 13 can rotate and thereby also gear 12 and eccentric 9 due to their inherent momentum, but they are no longer driven. This is accomplished by moving the bolt 18 on shaft 6 to the left. As a result shaft 6 with sleeve 19 move relative to gear 13 which is no longer driven and therefore moves slower than shaft 6. During this shifting the pins 21 arrive in the deepest position between the control tracks 20. Due to the rotation of sleeve 19 relative to the gear 13 and housing 14 the pins begin to slide on the tracks 20, thereby pushing the sleeve to the right in the direction of gear 13. This movement is supported by spring 17. The control tracks are so designed that as the pins moving thereon reach the highest point, sleeve 19 has been moved so far toward gear 13 that the abutment members 15 and studs 16 are fully engaged and gear 13 is again driven, but it has been displaced by an angle of 180°. As a result there is also an angular displacement by 180° of the gear wheel 12 with eccentric 9 relative to eccentric 2 and shaft 1.

By utilizing a chain drive as the drive means for the eccentric 2 arranged upon the eccentric shaft 1, and a tooth drive as the drive means for the eccentric 9 rotatably mounted upon the eccentric shaft 1, the two eccentric bodies 2 and 9 are caused to move in opposite directions so that controlled vibrations or oscillations are produced. The transmission of force from the control shaft 6 onto the eccentric 9 takes place by way of the abutment studs 16 arranged upon the sleeve, which rest against the abutment members 15 of the toothed gear 13.

The eccentric 2 is firmly mounted on shaft 1 and eccentric 9 is fixedly connected with toothed gear 12 as indicated by a welded seam and the two parts are rotatably journalled on shaft 1 by means of bearings 10 and 11. The driving force is applied by pinion 8 and gear 7. Rotational movement is applied to the shaft 1 by means of chain 4 and chain wheels 3 and 5. Due to the use of a chain the shafts 6 and 1 rotate in the same direction. Eccentric 9 rotates in the opposite direction because it is driven by way of gears 13 and 12.

By actuating the bolt 18 the sleeve 19 is axially displaced upon the control shaft 6 against the force of the spring 17. The members 15 and 16 are thereby caused to disengage so that the toothed gear 13 is enabled to turn with the housing 14 relative to the sleeve 19. Due to the axial sliding of the sleeve 19 and the consequent relative rotation of the toothed gear 13 with housing 14 relative to the sleeve 19, the pins 21 provided on the sleeve 19 are caused to slide on the control tracks 20, and thereby press the sleeve 19 in accordance with a predetermined angle of rotation of the toothed gear 13 in relation to the sleeve 19 again toward the toothed gear 13. By means of this arrangement the toothed gear and housing 13, 14 can be positively turned with respect to the sleeve 19 only by an angle of 180° until the members and studs 15 and 16 are again in engagement. Due to the relative turning movement of the toothed gear 13 with respect to the sleeve 19 by 180°, the toothed gear 12 and the eccentric body 9 which is rigidly connected therewith are subsequently also turned upon the eccentric shaft 1 with respect to the eccentric 2 by 180° so that a direction of vibrations of the eccentrics that is changed by 90° can be obtained.

In FIG. 1 the abutment member 15 is located directly behind one of the abutment studs 16 of the sleeve 19. The second abutment member 15 is not visible due to the manner in which the section is taken. The two pins 21 are disposed in such a manner that in operation their position corresponds to the lowest position of the control tracks 20. As seen in FIG. 1, the pins 21 are out of contact with the crests of the control tracks 20.

The operation and shifting on the control shaft 6 takes place in that the sleeve 19 which is rotatable with the shaft is moved axially on the shaft. The abutment studs 16 on the sleeve 19 are in engagement with the members 15 of the toothed gear 13. The sleeve 19 is moved to the left by means of bolt 18 as seen in FIG. 1 until the members 15 and studs 16 are disengaged. The pins 21 of the sleeve 19 thereby are brought into engagement with the lowest point on the control tracks 20. However, since the members 15 and studs 16 are disengaged, the toothed gear 13 is no longer driven and, as a result, lags behind with respect to the shaft 6, and therefore also with respect to the sleeve 19, so that the abutment members 15 and studs 16 pass one another. As soon as the driven sleeve 19 has turned angularly with respect to the toothed gear 13 which no longer is driven, the pins 21 begin to slide on the control track 20, and owing to the incline of the control tracks the sleeve 19 is pushed back toward the right.

As a result, the abutment studs 16 are again engaged with the members 15. However, the members 15 have stayed behind 180°. Since, however, the toothed gears 12 and 13 are equal, also the eccentric 9 has stayed behind the eccentric 2 by 180°. This causes a turning of the resultant eccentric forces of the cams 2 and 9 by an angle of 90°.

Having now described the invention with reference to the embodiment illustrated in the drawing, what applicant desires to protect by Letters Patent is set forth in the appended claims.

I claim:

1. Eccentric shaker for earth compacting apparatus or the like comprising two oppositely acting eccentrics, a common eccentric shaft supporting said eccentrics and a coupling which is engageable and disengageable for changing the direction of vibration of said eccentrics by relative turning of one eccentric body relative to the other, one said eccentric being fixedly mounted on said eccentric shaft for rotation in one direction, a control shaft disposed parallel to said eccentric shaft, a chain drive between said shafts comprising a pair of chain wheels, one mounted adjacent the end of said control shaft and the other mounted on said eccentric shaft proximate said one wheel and a chain between said wheels, the other said eccentric being mounted on said eccentric shaft for rotation in opposite direction by means of a toothed gear drive comprising a toothed gear rotatably journalled on said control shaft and defining a part of a housing, a pair of oppositely disposed control tracks at one end of said housing and a pair of oppositely disposed studs at the other end thereof, an axially slidable sleeve on said control shaft presenting a pair of abutment members cooperating with said studs, a spring biasing said sleeve against said toothed gear, said sleeve having a pair of pins extending therefrom and being non-rotatably mounted on said control shaft, a collar on said sleeve and an actuating member in engagement with said sleeve for effecting axial movement thereof.

2. Eccentric shaker in accordance with claim 1, where said oppositely disposed control tracks, said slide cams and said abutment members are disposed at angles of 180° relative to one another.

References Cited

UNITED STATES PATENTS 3,385,119   5/1968   Berger _____ 94—48 X

JACOB L. NACKENOFF, Primary Examiner

U.S. Cl. X.R.

74—61